J. HIMES.
HOLDER FOR TEMPLET GAGES FOR SETTING CUTTERS IN CUTTER HEADS.
APPLICATION FILED OCT. 23, 1911.
1,046,296.
Patented Dec. 3, 1912.
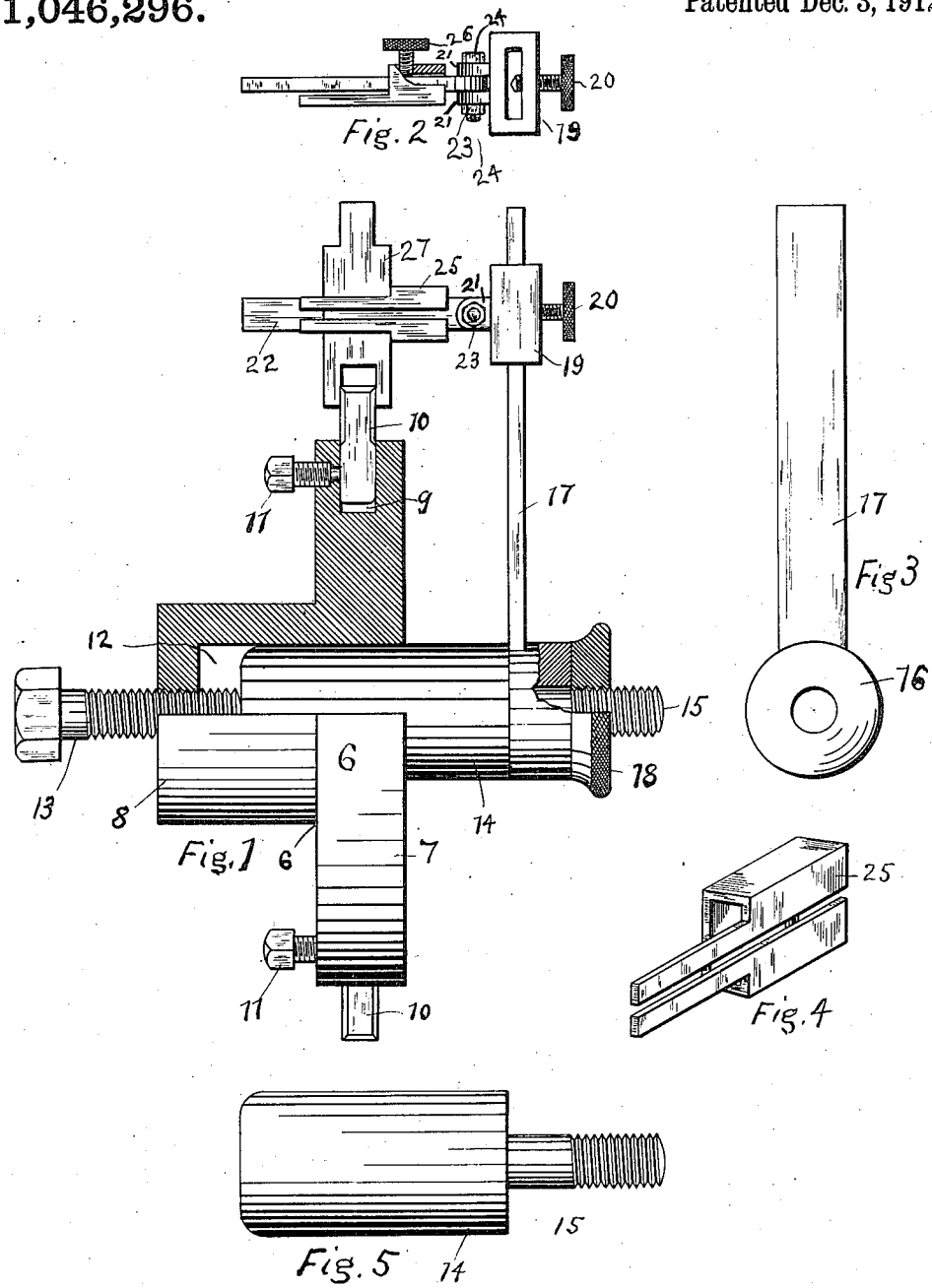
WITNESSES:
J. W. Patterson
Roger Ward Shotwell
INVENTOR
Joseph Himes
BY
C. D. Haskins
ATTORNEY

UNITED STATES PATENT OFFICE.

JOSEPH HIMES, OF SEATTLE, WASHINGTON.

HOLDER FOR TEMPLET-GAGES FOR SETTING CUTTERS IN CUTTER-HEADS.

1,046,296.  Specification of Letters Patent.  Patented Dec. 3, 1912.

Application filed October 23, 1911. Serial No. 656,335.

*To all whom it may concern:*

Be it known that I, JOSEPH HIMES, a citizen of the United States, residing at Seattle, in the county of King and State of Washington, have invented a certain new and useful Improvement in Holders for Templet-Gages for Setting Cutters in Cutter-Heads, of which the following is a specification.

My invention relates to improvements in gages adapted for setting cutters in the cutter-heads of wood working machinery that is employed for cutting, planing and forming tongued and grooved flooring, wood moldings, ship-lap and the like, and the object of my improvement is to provide a cutter-setting gage which shall be simple in construction, easily manipulated and which shall enable an operator quickly and accurately to set and adjust to a suitable fixed position in a cutter-head any desired form of cutters whereby all the cutters so set in a cutter-head shall have their respective cutting edges all of an equal distance from the axis from such cutter-heads so that such cutters in their operation may cut a shaving of the same thickness and thus produce a regular surface upon the wood being cut. I attain this object by devices illustrated in the accompanying drawings in which—

Figure 1 is a view in side elevation of my invention wherein some portions are shown in longitudinal sections. Fig. 2 is a plan-view, partly in cross-section, of parts of the same. Fig. 3 is front elevation of a detail of my invention. Fig. 4 is a perspective view of another detail and Fig. 5 is a side elevation of a part of my invention.

Referring to the drawing, 6 is one form of cutter-head, in connection with which I show my invention, which cutter-head comprises a disk 7 and hub 8 cast in one piece as shown in Fig. 1. The disk 7 is provided with radial holes 9 in its periphery (one of which holes 9 are shown in cross-section in Fig. 1) within which holes 9 are disposed cutters 10 which may be securely clamped in their proper positions by binding screws 11. Through the center of the disk 7 and into the hub 8 is bored a hole 12 of suitable size to fit tightly the spindle of a machine upon which it is to be mounted for operation. Through the center of the end of hub 8 is disposed a screw 13 by which the cutter-head 6 may be forced off the spindle of the machine when it is desired to remove the cutter-head 6 from such spindle for the purpose of grinding or changing cutters.

To set the cutters 10 so that their cutting edges are exactly the same distance from the axis around which said cutter-head 6 revolves I have provided a gage plug 14 formed as shown in Fig. 5 and adapted to fit tightly the hole 12 in cutter-head 6 as shown in Fig. 1. This gage plug 14 on its end which projects from cutter-head 6 is provided with a projection 15 of smaller diameter having a threaded screw on its end portion. This projection 15 is adapted to receive and support a closely fitting sleeve 16 which is provided with a radially projecting arm 17 whereby such arm 17 may swing and revolve around such projection 15. A milled nut 18 fits the threaded portion of the projection 15 to secure the sleeve 16 in a position of engagement with the shoulder of the gage plug 14 as shown in Fig. 1 whereby said sleeve may be confined with respect to longitudinal movement on projection 15.

Slidably mounted on arm 17 is a carrier 19 which may be moved to any desired position on said arm 17 and there fastened by a clamping screw 20. On the side of carrier 19 are projecting ears 21 to which is hinged a bar 22 by the aid of bolt 24 and nut 23 whereby the bar 22 may be moved vertically to any desired angle with respect to the carrier 19 and the arm 17 and be secured at such angle by tightening the nut 23.

The bar 22 has mounted upon it a clamping device 25 which is adapted to be moved longitudinally to any desired position on said bar 22 and there fastened by a binding screw 26 as shown in Fig. 2. The form of this clamp 25 is more clearly shown in perspective view in Fig. 4. A templet 27 is made of thin sheet metal with one edge formed to fit the contour of the cutting edges of the cutters 10 to be set and is adapted to be clamped between the clamp 25 and the bar 22 as shown in Fig. 1.

The operation of setting the cutters 10 so that their cutting edges shall be accurately the same distance from the axis of the cutter-head 6 consists simply in forcing the gage plug 14 into the hole 12 of the cutter-head 6 and then mounting the sleeve 16 on the projection 15 and securing it by nut 18 so that it may be free to rotate and carry the arm 17 with its carrier 19 and bar 22 around the cutter-head 6 to the position of any cutter disposed thereon. One of the cutters 10 is then set and fastened in its desired position by binding screw 11 whereupon the templet 27 is placed in a position on bar 22 so that its edge accurately fits the contour of the cutting edge of cutter 10 and is there clamped fast whereupon the arm 17 may now be moved to the position for setting the other cutter 10 which is adjusted so that its cutting edge will lightly touch and fit the contour of the templet 27 as said templet 27 is moved over said cutter 10 by the swing of arm 17. Thus when both cutters 10 are properly set the gage templet 27 when revolved around the cutter 6 by movement of the arm 17 will barely touch and fit the cutting edges of both cutters 10. When the cutters are set and fastened the plug 14 may be forced out of hole 12 of the cutter-head 6 by the screw 13 whereupon the cutter-head 6 with the now properly set cutters 10 may be mounted for work upon a machine spindle not shown.

Manifestly various forms of templet may be attached to bar 22 to gage the setting of various forms of cutters but such modification of forms of cutters would in no wise depart from the spirit of my invention.

What I claim is:

In a gage for setting cutters, a plug adapted to fit and be supported in a fixed position within, and concentrically with the axis of, the boring of a cutter-head, said plug being provided at one end with a projecting stud whose axis co-incides with the axis of said plug, an arm movably mounted upon and adapted to swing and turn on and around said stud, a carrier adjustably and slidably mounted upon said arm, and a bar hingedly attached to said carrier and adapted to be moved to, and be secured at, a position of any angle with respect to said arm, in combination with an adjustably slidable clamp mounted on said bar and adapted to clamp a templet gage in a desired position on said bar.

In witness whereof, I hereunto subscribe my name this twelfth day of October A. D., 1911.

JOSEPH HIMES.

Witnesses:
 ELSIE HIMES,
 EMMA HIMES.